(12) United States Patent
Couillard et al.

(10) Patent No.: US 6,643,066 B2
(45) Date of Patent: Nov. 4, 2003

(54) TUNABLE PHASE MASK ASSEMBLY

(75) Inventors: Jean-François Couillard, Sunnyvale, CA (US); François Trépanier, St-Augustin-de-Desmaures (CA); Chiara Meneghini, Sainte-Foy (CA); Jocelyn Lauzon, Saint-Augustin-de-Desmaures (CA)

(73) Assignee: Institut National d'Optique, Quebec (CA)

( * ) Notice: Subject to any disclaimer, the term of this patent is extended or adjusted under 35 U.S.C. 154(b) by 0 days.

(21) Appl. No.: 10/022,974

(22) Filed: Dec. 13, 2001

(65) Prior Publication Data

US 2003/0112516 A1 Jun. 19, 2003

(51) Int. Cl.$^7$ ................................. G02B 5/18
(52) U.S. Cl. ........................ 359/573; 359/575; 359/566; 385/37; 385/10
(58) Field of Search ........................... 385/37, 10, 124; 359/566, 573, 575, 130; 398/87

(56) References Cited

U.S. PATENT DOCUMENTS

| | | | |
|---|---|---|---|
| 4,474,427 A | 10/1984 | Hill et al. ................ 350/96.3 |
| 5,367,588 A | 11/1994 | Hill et al. ................ 385/37 |
| 5,671,307 A * | 9/1997 | Lauzon .................... 385/37 |
| 5,748,814 A | 5/1998 | Painchaud et al. .......... 385/37 |
| 5,857,043 A | 1/1999 | Cook et al. |
| 5,903,689 A | 5/1999 | Painchaud et al. .......... 385/37 |
| 6,004,703 A | 12/1999 | Jang et al. |
| 6,130,973 A | 10/2000 | Lauzon et al. ............. 385/37 |
| 6,307,679 B1 * | 10/2001 | Kashyap .................. 359/569 |
| 2001/0019741 A1 * | 9/2001 | Inaba ..................... 427/444 |

FOREIGN PATENT DOCUMENTS

| EP | 0 606 726 | 7/1994 |
|---|---|---|
| JP | 06 230298 | 8/1994 |

OTHER PUBLICATIONS

G.A. Ball and W.W. Morey, "Compression–tuned single–frequency Bragg grating fiber laser", Optics letters, vol. 19, #23, Dec. 1, 1994, pp.1979–1981.

P.J. Lemaire et al. "High pressure H2 loading as a technique for achieving ultrahigh UV photosensitivity and thermal sensitivity in GeO2 doped optical fibres", Electronics Letters, vo. 29, #13, Jun. 1993, pp.191–1193.

J. Martin et al., "Novel writing technique of long and highly reflective in–fibre gratings", Electronics Letters, vol. 30, #10, May 12, 1994, pp. 811–812.

G. Meltz et al., "Formation of Bragg gratings in optical fibers by a transverse holographic method", Optics Letters, vol. 14, #15, Aug. 1989, pp. 823–825.

J.D. Prohaska et al., "Magnification of mask fabricated fibre Bragg gratings", Electronics Letters, vol. 29, #18, Sep. 1993, pp. 1614–1615.

M.J. Cole et al., "Moving fibre/phase mask–scanning beam technique for enhanced flexibility in producing fibre gratings with uniform phase mask", Electronics Letters, vol. 31, #17, Aug. 1995, pp. 1488–1490.

* cited by examiner

Primary Examiner—John Juba
Assistant Examiner—Leo Boutsikaris
(74) Attorney, Agent, or Firm—Merchant & Gould P.C.

(57) ABSTRACT

A tunable phase mask assembly for use in photoinducing an optical wavelength filter in an optical waveguide. The phase mask assembly includes a phase mask having a length extending between two opposite longitudinal ends. The phase mask has grating corrugations projecting from its surface and distributed with a periodicity along its length. The periodicity of the phase mask is tuned by reversibly changing its length between the two longitudinal ends, such as by compressing or stretching the mask. In this manner, the interference pattern of a light beam passing through the phase mask is also tuned, which allows to control the characteristics of a wavelength filter photoinduced using this phase mask assembly.

5 Claims, 6 Drawing Sheets

TUNABLE PHASE MASK ASSEMBLY

FIELD OF THE INVENTION

The present invention relates to the field of optical wavelength filters and their inscription method into optical waveguides, and more particularly concerns a tunable phase mask assembly used for such an operation.

BACKGROUND OF THE INVENTION

Optical filters usually consist of a periodic index change permanently photo-written into an optical waveguide, in order to create wavelength-selective mode coupling in this waveguide. The photo-writing process involves exposing the waveguide to an ultraviolet optical beam patterned as the desired periodic index change. Fiber Bragg Gratings (FBG) are wavelength-selective all-fiber filters photo-written by using an ultra-violet beam incident on a phase mask before exposing the fiber. FBGs are key components for the development of DWDM (Dense-Wavelength Division Multiplexing) optical communication networks.

The phase mask FBG writing technique is a well established reliable industrial process for the mass production of FBGs. In this approach, a phase mask having periodical grating corrugations is placed in the path of a light beam, which is diffracted by the mask to generate an interference pattern. This interference pattern is photoinduced in the fiber or other photosensitive material to write the FBG. However, an important drawback of the phase mask technique is that you can only write one type of FBG at a very precise center wavelength with each set-up. If gratings at different wavelengths have to be written, the phase mask has to be changed within the fabrication set-up which is time consuming, and requires keeping a very large and expensive stock of phase masks.

Different techniques have been proposed in the past to be able to tune the center wavelength of photo-written FBGs without changing the phase mask element that is part of the writing set-up. One such technique, suggested by G. A. Ball et al. in "Compression-tuned single frequency Bragg grating fiber laser", Optics Letters, vol 19, no 23 (1994) pp. 1979–1981, consists of stretching or compressing the fiber behind the phase mask. In these cases, the fiber grating is photo-written at the same wavelength as when the fiber is unstretched or uncompressed; however, once the fiber is relaxed to its initial state, the grating is tuned accordingly. Tunability as large as 0.5% has been shown by stretching the fiber and as large as 2.5% by compressing the fiber. However, in both cases, the fiber is mechanically weakened during the process, and the risks of breaking the fiber are important. Additionally, it is difficult to accurately determine the elasticity of the fiber in order to obtain a perfectly repeatable process. Compressing the fiber without bending it is also a very challenging demand.

U.S. Pat. No. 5,671,307 (LAUZON et al.) shows another approach for tuning the center wavelength of photo-written FBGs, without changing the phase mask element that is part of the writing set-up. LAUZON teaches inducing a temperature change in the fiber, through the thermo-optic and thermal expansion coefficients of glass. However, silica glass (the material from which standard optical fibers are made) having very poor thermal conductivity, it is difficult to implement such temperature tuning over a fiber section of more than a few millimeters. Also, tunability of only 0.01 nm/° C. can be expected using this method. Thus very high temperature changes of the order of 100° C. would need to be used to have a substantial impact on the resulting FBG. Generating such high temperature changes is not cost and power efficient.

There is therefore a need for tuning the period of a FBG written using the phase mask technique without constantly changing the phase mask, or risking damages to the fiber.

OBJECTS AND SUMMARY OF THE INVENTION

It is therefore an object of the present invention to provide a phase mask having a tunable periodicity.

Accordingly, the present invention provides a tunable phase mask assembly for diffracting a light beam passing therethrough and generating an interference pattern having a period.

The phase mask assembly first includes a phase mask having a length extending between first and second opposed longitudinal ends. The phase mask also has a longitudinal surface provided with a plurality of grating corrugations projecting therefrom, distributed with a periodicity along the length of the phase mask.

The assembly also includes means for reversibly changing the length of the phase mask between the longitudinal ends thereof. In this manner, the periodicity of the grating corrugations is changed and the period of the interference pattern is tuned.

The present invention also provides a method for tuning a period of an interference pattern generated by a light beam diffracted by a phase mask. The phase mask has a length extending between two opposed longitudinal ends, and a longitudinal surface provided with a plurality of grating corrugations projecting therefrom. The grating corrugations are distributed with a periodicity along the length of the phase mask. The method includes a step of reversibly changing the length of the phase mask between the longitudinal ends thereof, thereby changing the periodicity of the grating corrugations and tuning the period of the interference pattern.

In accordance with preferred embodiments of the present invention, it is the phase mask, not the optical fiber, that is compressed or stretched in order to change the center wavelength of the photo-written FBG. The phase mask corrugation period translates directly, through a mathematical formula that varies with the phase mask characteristics, into the light beam periodicity that in turn translates directly into the index change grating period and thus on the wavelength response of the photo-written FBG. Stretching or compressing the phase mask has a direct impact on its corrugation period. Advantageously, using phase masks that can be compressed or stretched results in a tunable fabrication method for FBGs, that is a non-contact method for the FBG, it thus has no impact on its post-FBG writing mechanical performance of the fiber. It ensures good reproducibility and good performance since what you see (during the FBG writing process) is what you get. Also, performance is ensured in an industrial production situation because it is much easier to have a good grip or do a controlled compression on a substrate having a regular shape with large contact surfaces in which the phase mask is imprinted, than on the very small and flexible optical fiber.

Further features and advantages of the present invention will be better understood upon reading of preferred embodiments thereof with reference to the appended drawings.

DESCRIPTION OF PREFERRED EMBODIMENTS OF THE INVENTION

The present invention concerns a tunable phase mask assembly for diffracting a light beam passing therethrough, thereby generating an interference pattern having a period. Such an interference pattern may then be photo-written in a photosensitive medium such as a length of optical fiber, which with proper processing will as a result show a reflectivity peak at a wavelength depending directly on the period of the phase mask. Changing the periodicity of the phase mask therefore allows to move the peak of the reflectivity spectrum of the resulting FBG. It should however be noted that the applicability of the present invention is not limited to FBGs photoinduced in optical fiber, but may be extended to any technique using a phase mask to generate an interference pattern in a light beam.

The phase mask assembly of the present invention first includes a phase mask 12, as for example shown in FIGS. 4A, 4B, 5A and 5B. The phase mask 12 has a length 14 extending between first and second longitudinal ends 16 and 18. The upper longitudinal surface 20 of the phase mask is provided with a plurality of grating corrugations 22. The corrugations project from the surface 20 and are periodically distributed along the length 14 of the phase mask with a period $\Lambda$. The phase mask 12 may be manufactured from any appropriate method such as, for example, electron-beam lithography or holographic techniques. In the illustrated embodiment, a rectangular phase mask of regular period is shown, but it is understood that the present invention could equally be embodied with a phase mask having any other physical characteristics such as a non-linear period, an apodized profile, etc.

Figure 4A:
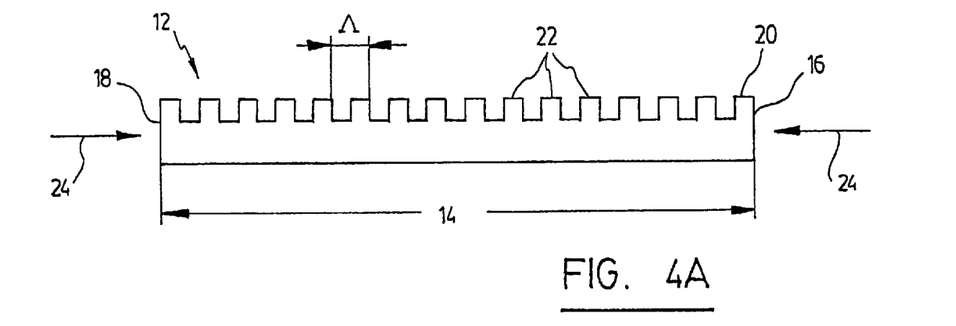
FIG. 4A is a front view of a phase mask showing a compressive force applied thereon in accordance with a preferred embodiment of the invention.
Figure 4B:
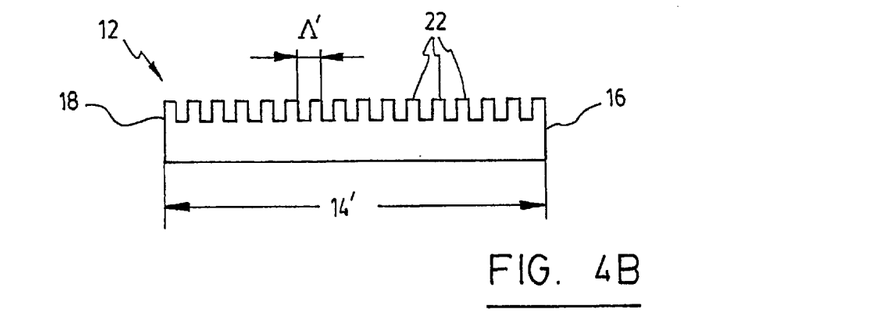
FIG. 4B shows the phase mask of FIG. 4A when compressed by the compressive force.
Figure 5A:
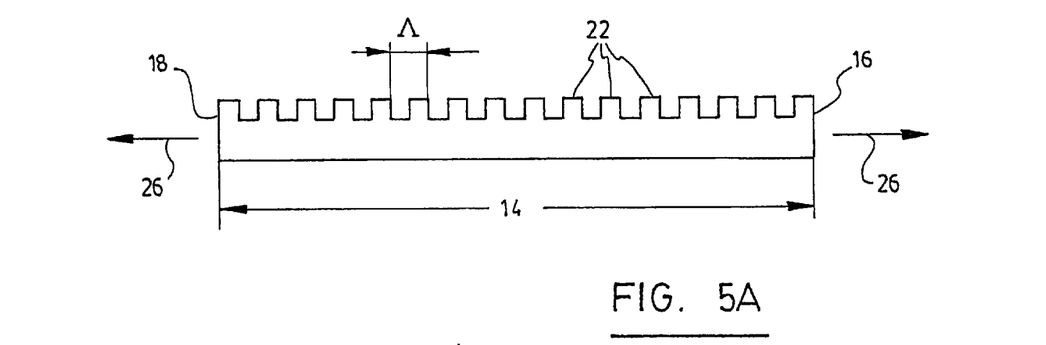
FIG. 5A is a front view of a phase mask showing a stretching force applied thereon in accordance with a another preferred embodiment of the invention.
Figure 5B:
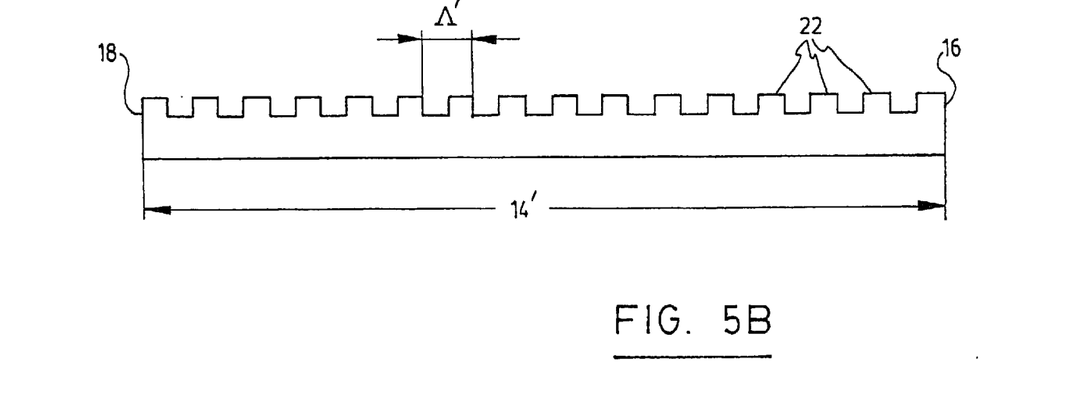
FIG. 5B shows the phase mask of FIG. 5A when stretched by the streching force.

The present invention also provides means for reversibly changing the length 14 of the phase mask 12 between the first and second longitudinal ends 16 and 18. These means may be embodied by any device having either one of the two opposite but operationally equivalent effects of a compression of the mask 12, or an extension thereof. FIG. 4A shows a mask 12 being subjected to a compression force 24, resulting in a mask of a shorter length 14' between its same longitudinal ends 16 and 18, and thereby a shorter period $\Lambda'$ for the grating corrugations 22, as shown in FIG. 4B. Similarly, FIG. 5A shows the application of a stretching force 26 on the mask 12, resulting in the mask of FIG. 5B having a greater length 14' and greater period $\Lambda'$.

The means for changing the length as described above are reversible. By this it is understood that when the force applied to the mask is removed, the mask substantially returns to its original length. In this manner, the assembly of the present invention may be used repetitively to change the period of the mask at will without making any modification to the general set-up. This is in effect a "tuning" of the periodicity of the grating corrugations and therefore of the period of the interference pattern. The phase mask substrate has to be made flexible enough to be elastic for many cycles, but strong enough to have a controllable behavior. In order to obtain a good compromise between these two factors, the thickness of the substrate has to be controlled considering the mechanical characteristics of the substrate material, for example fused silica.

Figure 1:
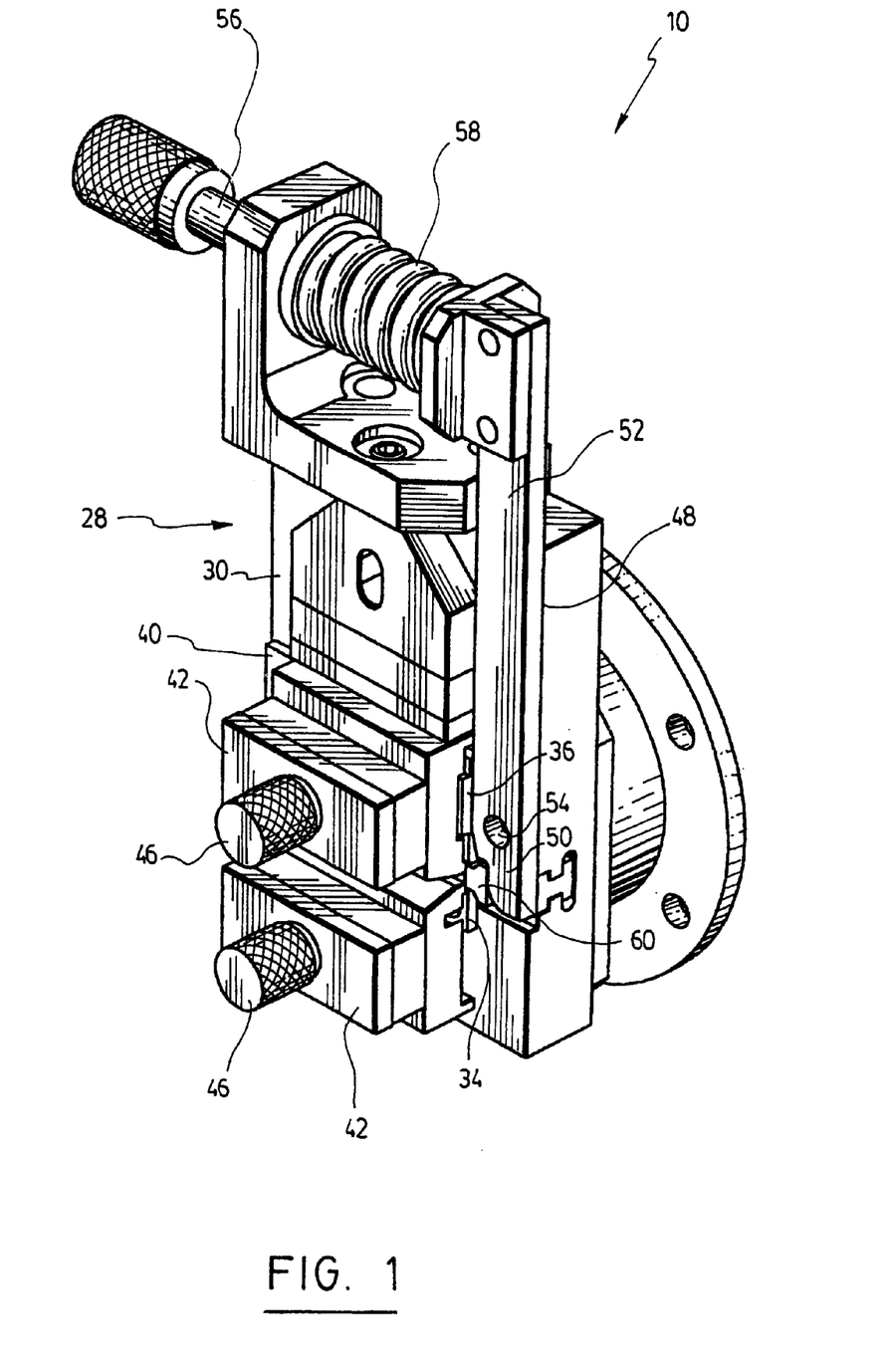
FIG. 1 is a side elevation of a phase mask assembly according to a preferred embodiment of the invention.
Figure 2:
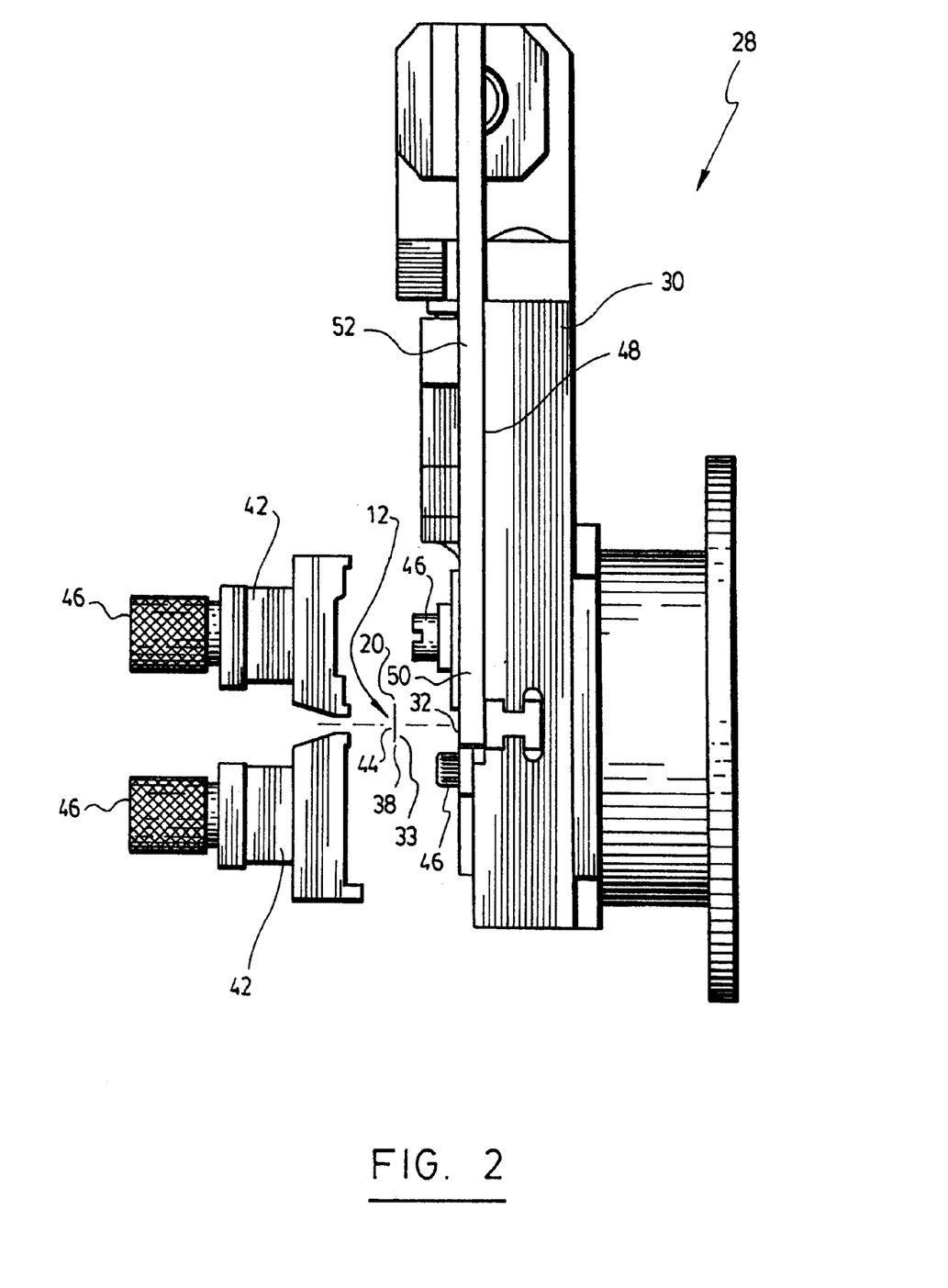
FIG. 2 is a partially exploded side view of the assembly of FIG. 1.
Figure 3:
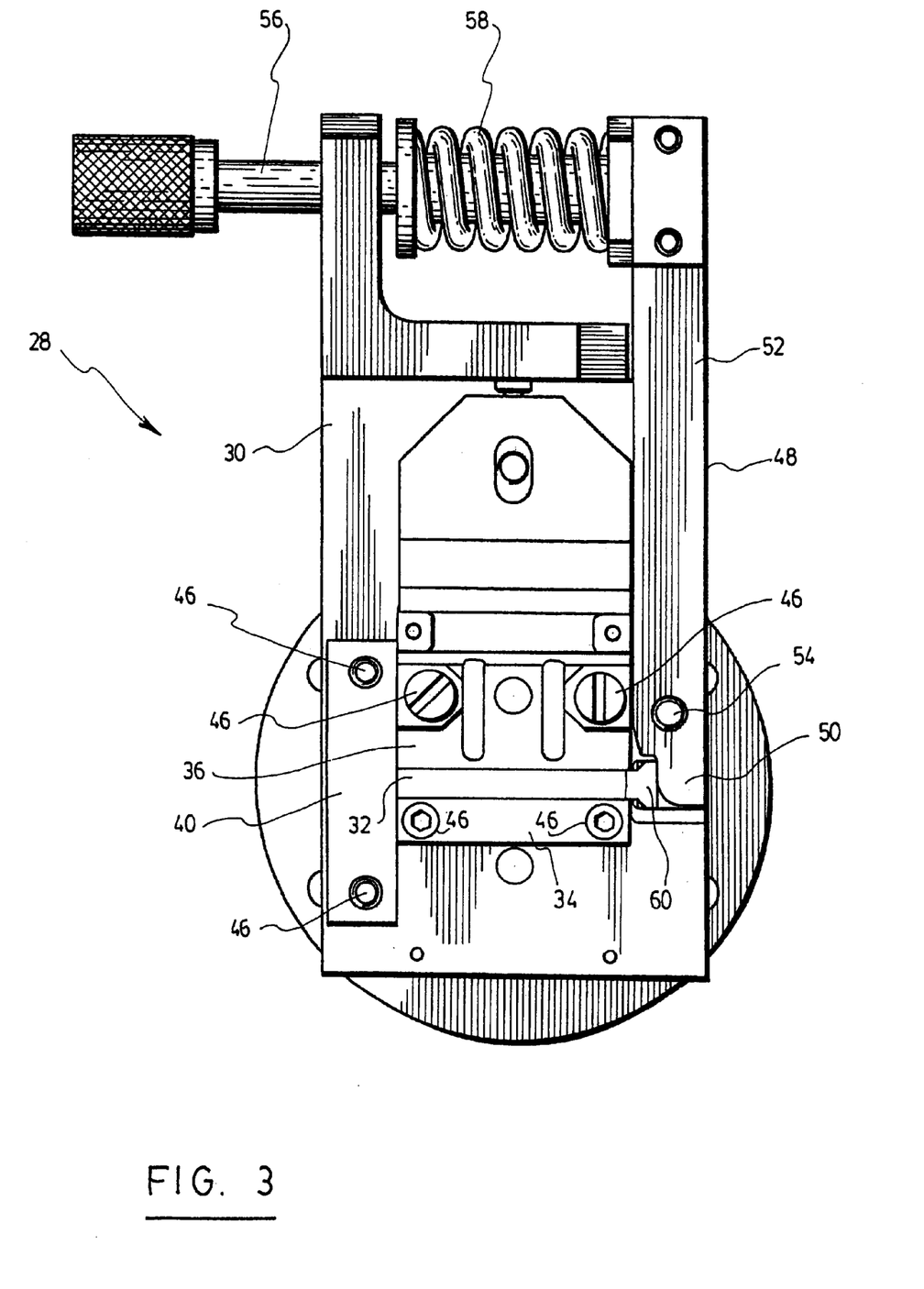
FIG. 3 is a front view of the assembly of FIG. 1 with the top supports of the phase mask removed.

Referring to FIGS. 1 to 3, there is shown a phase mask assembly 10 according to a preferred embodiment of the present invention. In this embodiment, the means for reversibly changing the length of the phase mask 12 include a mounting device 28, on which the phase mask 12 is securely mountable. In the illustrated embodiment, the mounting device 28 has a frame 30 having a mask back support 32 for supporting the back surface 33 of the phase mask 12, top and bottom arms 34 and 36 for abutting on the top and bottom longitudinal surfaces 20 and 38 of the phase mask 12, a side arm 40 for abutting on the second longitudinal end 18 of the phase mask 12, and at least one top support 42 affixable over the front surface 44 of the phase mask 12. Two such top supports 42 are provided in the illustrated embodiment. All of the top arm 34, bottom arm 36, side arm 40 and top supports 42 have a position adjustable to accommodate the precise dimensions of the phase mask 12, for example through screws 46.

The means for reversibly changing the length of the phase mask 12 also preferably include a pivot arm 48 pivotally connected to the frame 30 of the mounting device 28. The pivot arm 48 has first and second opposite portions 50 and 52, extending on either sides of the pivot point 54 connecting the pivot arm 48 to the frame 30. The pivot arm 48 extends in a direction generally transversal to the length 14 of the phase mask 12 when the mask is mounted on the mounting device, with the first portion 50 positioned in alignment with the first longitudinal end 16 of the phase mask 12. A screw 56 cooperating with a spring 58 applies a force on the second portion 52 of the pivot arm 48, generating an opposite force along the length of the phase mask 12. Of course, any other force applying means achieving the same result would be within the scope of the present invention. In the present embodiment, the first portion 50 of the pivot arm 48 abuts on a pushing member 60 which in turn abuts on the first longitudinal end 16 of the phase mask 12, and is longitudinally movable. When the force is applied on the pivot arm 48, the phase mask is compressed by the combined action of the pushing member 60 and first portion 50 of the pivot arm 48. Releasing the screw 56 will in turn allow the phase mask 12 to relax to its original length.

In the embodiment described above, the phase mask is compressed from the right side and also from the top. The compression from the right side acts directly on the phase mask corrugation period (or periods if the corrugation pattern is not uniform). The compression from top is only used to ensure that the phase mask remains perfectly fixed while it is compressed from the right side. Thus, the angular and vertical orientations of the phase mask corrugation period remain the same relative to the optical fiber which is in contact or in very close proximity to the mask. It is estimated that a silica phase mask properly designed can be compressed by 0.3% with a lateral compression of 240 Mpa. That would result in a FBG tunability of 5 nm for a filter acting in the 1550 nm spectral region. It is estimated that a silica phase mask properly designed could resist a compression as large as 350 MPa. This would correspond to applying a force of 1000N (~100 kg) over a surface of 4 mm².

As an alternative embodiment, the compressive force may have a gradient, thereby generating an effective phase mask having a non-uniform profile. Such a result may for example be achieved by using a phase mask having a varying width or thickness.

In yet another alternative embodiment, the first longitudinal end 16 of the phase mask 2 may be affixed to the first portion 50 of the pivot arm 48, and a force opposite to the one described above could be applied on the pivot arm 48, thereby stretching the phase mask 12 to a length greater than its original length.

Although the above embodiment involves applying a mechanical force to either compress or stretch the phase mask, other manners of changing the length of the mask are also considered as part of the present invention. For example, the phase mask 12 could be submitted to a temperature change or a temperature gradient, which would also have the effect of increasing its length through dilatation.

In accordance with the present invention, there is also provided a method for tuning a period of an interference pattern generated by a light beam diffracted by a phase mask. The phase mask has a length extending between two opposed longitudinal ends, and a longitudinal surface provided with a plurality of grating corrugations projecting therefrom. The grating corrugations are distributed with a periodicity along the length of the phase mask. The method includes a step of reversibly changing the length of the phase mask between the longitudinal ends thereof, thereby changing the periodicity of the grating corrugations and tuning the period of the interference pattern. This step may involve either applying a compressive or a stretching force between the longitudinal ends of the phase mask. Alternatively, the phase mask may be submitted to a temperature gradient to dilate it and therefore increase its length.

Figure 6:
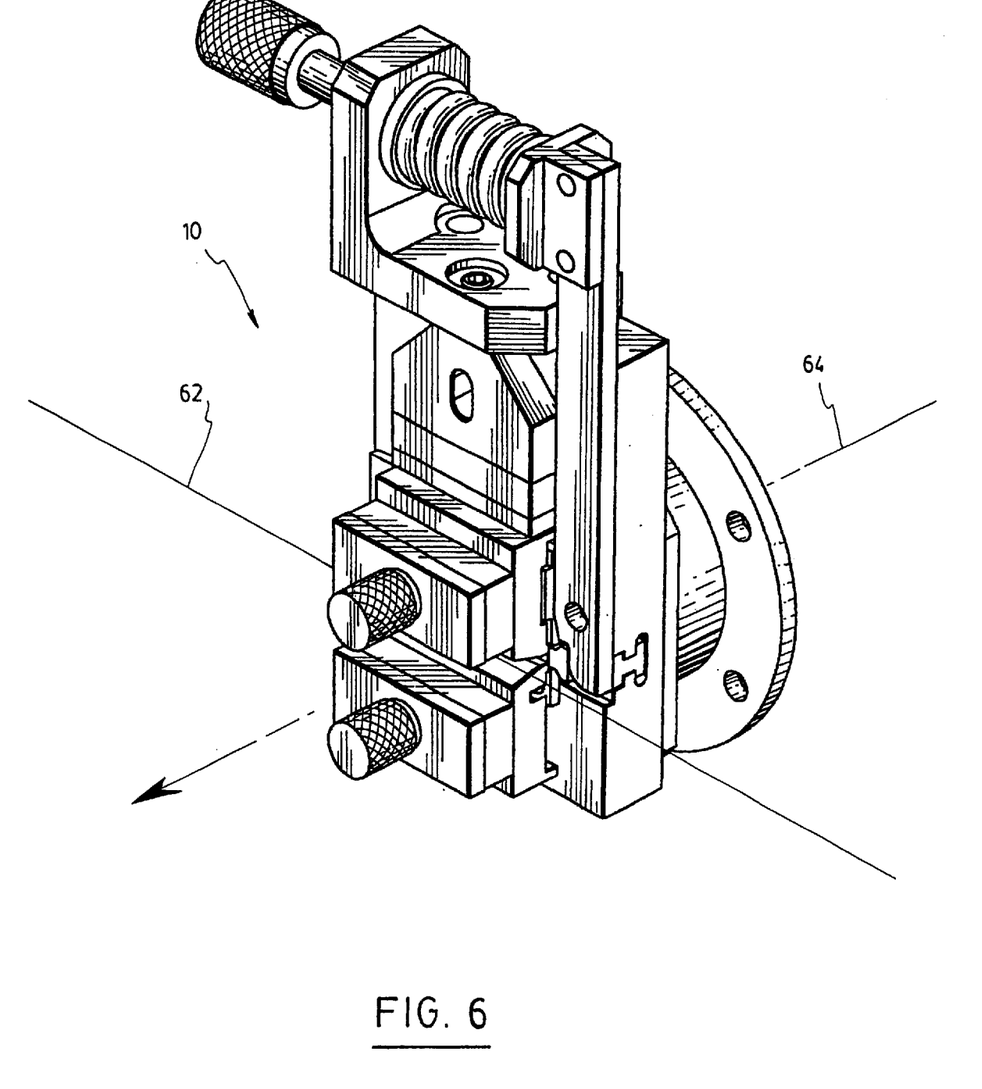
FIG. 6 is a schematic representation of a tunable phase mask assembly in a set-up to make photo-written FBGs.

In a preferred embodiment of the present invention, shown in FIG. 6, the phase mask assembly 10 may be used in a set-up to photoinduce a FBG in an optical fiber 62. The optical fiber 62, having UV photosensitive properties (a silica fiber having a core doped with germanium, having been hydrogen treated or not, is a good example of a photosensitive fiber) is longitudinally put in contact, or in very close proximity, with a phase mask having a precise and constant orientation. The acrylate coating on the fiber is removed on the surface where the fiber is in contact with the phase mask. This whole fiber section can be exposed to a high intensity UV light signal 64 through the phase mask, for example, 50 mW of UV light around 240 nm. The phase mask is made so as to minimize the zero order diffraction at the incident UV wavelength, by adjusting the depth of the phase mask corrugations. It is made to diffract most of the UV incident power into the +1 and −1 orders with equal intensities (not shown on FIG. 6). These orders of diffraction initially interfere with one another as they are leaving the phase mask. This interference region width along the phase mask is directly proportional to the incident UV beam dimension and the proximity to the phase mask surface. This interference region corresponds to a UV power periodical pattern. The period of this pattern is related to the period of the phase mask corrugation by the following relation:

$$\Lambda_{pattern}=(\Lambda_{phase\ mask})/2,$$

where the period is given by the symbol $\Lambda$. The UV fringe pattern being in contact with the UV photosensitive optical fiber, this pattern is imprinted into the fiber into a permanent index change profile along its length. This index change profile results in a very wavelength selective all-fiber filter: a fiber Bragg grating or FBG. In this case, the FBG transmits every spectral components except those that meet the Bragg condition which are reflected at least partially. The Bragg condition is given by:

$$\lambda=2n\Lambda_{pattern},$$

where n corresponds to the average refractive index of the optical fiber core within which the index grating is photo-written. It is possible to obtain a more complex spectral response from the all-fiber filter if the phase mask corrugation pattern is not uniform. In this case, the analysis of the resulting Bragg condition in the optical fiber can be made by assuming the phase mask can be separated into subsections, each having a uniform corrugation pattern, but each being different from one another.

The strength of the reflection grating, that is, the ratio of light that is reflected at a particular wavelength meeting the Bragg condition, is dependent on the amplitude of the permanently photo-written index grating and the length of the index grating. The amplitude of the index grating is dependent on many factors from UV exposure power, UV exposure time, fiber photosensitivity, UV exposure wavelength and many other parameters related to the writing set-up optimization. As for the grating length, it depends mainly on the phase mask length. In order to make sure that the whole phase mask surface, with which the optical fiber is in contact, or in very close proximity, is exposed to UV light, there are two possibilities: a) using a UV beam that is at least as large as the phase mask itself, b) scanning the UV beam along the phase mask.

Figure 7:
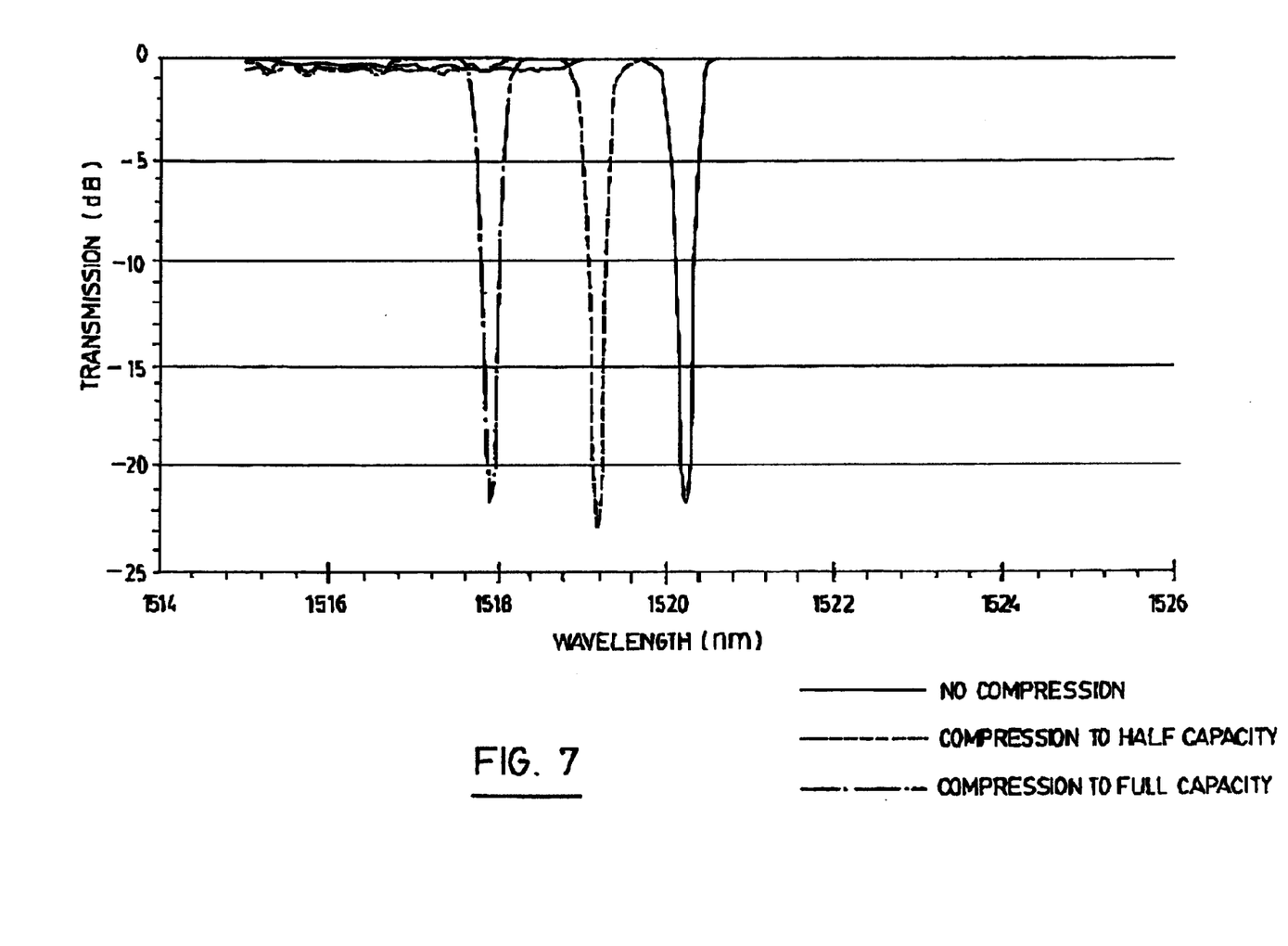
FIG. 7 is a graph showing the transmission peak of FBGs photo-written using a tunable phase mask assembly according to a preferred embodiment of the present invention, for three different mask compression values.

FIG. 7 shows some results obtained using a fabrication set-up similar to the set-up of FIG. 6. The results confirm that it is possible to tune the FBG wavelength by applying a compression to the phase mask. The very good reproducibility and quality of the fiber filter spectral response is also demonstrated. In this case, a tuning range of ~2.4 nm was demonstrated for an FBG acting in the 1520 nm spectral region. The phase mask dimensions that were used for this demonstration were: 4×30 mm, with a thickness of 2.1 mm. The durability of the phase mask to multiple compression cycles was also verified experimentally.

Of course, numerous modifications could be made to the embodiments described above without departing from the scope of the invention as defined in the appended claims.

What is claimed is:

1. A tunable phase mask assembly for diffracting a light beam passing therethrough and generating an interference pattern having a period, the phase mask assembly comprising:

a phase mask having a length extending between first and second opposed longitudinal ends, said phase mask having a longitudinal surface provided with a plurality of grating corrugations projecting therefrom and distributed with a periodicity along said length; and     means for reversibly changing the length of the phase mask between said longitudinal ends, thereby changing the periodicity of the grating corrugations and tuning the period of the interference pattern; wherein the means for reversibly changing the length of the phase mask comprise:

a mounting device, the phase mask being securely mountable thereon;

a pivot arm having first and second opposite portions and being pivotally connected to the mounting device between said portions, said pivot arm extending in a direction generally transversal to the length of the phase mask and the first portion being positioned in alignment with the first longitudinal end of the phase mask when said phase mask is mounted on the mounting device; and force applying means for applying a force on the second portion of the pivot arm, thereby generating an opposite force along the length of the phase mask.

2. A tunable phase mask assembly according to claim 1, wherein the opposite force generated by the force applying means compresses the phase mask.

3. A tunable phase mask assembly according to claim 2, wherein said force applying means includes a screw abutting on the second portion of the pivot arm and a spring cooperating with said screw.

4. A tunable phase mask assembly according to claim 1, wherein the mounting device comprises a pushing member contacting the first longitudinal end of the phase mask and being longitudinally movable.

5. A tunable phase mask assembly according to claim 1, wherein the mounting device comprises a frame having a mask back support for supporting a back surface of the phase mask, top and bottom arms for abutting on top and bottom longitudinal surface of the phase mask, a side arm for abutting on the second longitudinal end of the phase mask, and at least one top support affixable over the phase mask when said phase mask is mounted on the mounting device to abut on a front surface of the phase mask.

* * * * *